United States Patent [19]
Jarrett et al.

[11] 4,194,168
[45] Mar. 18, 1980

[54] UNIDIRECTIONAL RING LASER APPARATUS AND METHOD

[75] Inventors: Steven M. Jarrett, Los Altos; Michael W. Leitner, Palo Alto, both of Calif.

[73] Assignee: Spectra-Physics, Inc., Mountain View, Calif.

[21] Appl. No.: 854,517

[22] Filed: Nov. 25, 1977

[51] Int. Cl.² ............................................. H01S 3/083
[52] U.S. Cl. .................................................. 331/94.5 C
[58] Field of Search ...................... 331/94.5 C, 94.5 S, 331/94.5 T; 356/350

[56] References Cited

U.S. PATENT DOCUMENTS

| 3,456,210 | 7/1969 | Statz et al. | 331/94.5 T |
| 3,584,312 | 6/1971 | Statz | 331/94.5 S |
| 3,824,492 | 7/1974 | Brienza et al. | 331/94.5 C |

Primary Examiner—William L. Sikes
Attorney, Agent, or Firm—Donald C. Feix

[57] ABSTRACT

Ring configuration dye laser capable of supporting laser oscillations in the form of backward and forward running waves and including unidirectional polarization shifter for causing preferential oscillation of one of said waves in unidirectional, single frequency operation.

8 Claims, 3 Drawing Figures

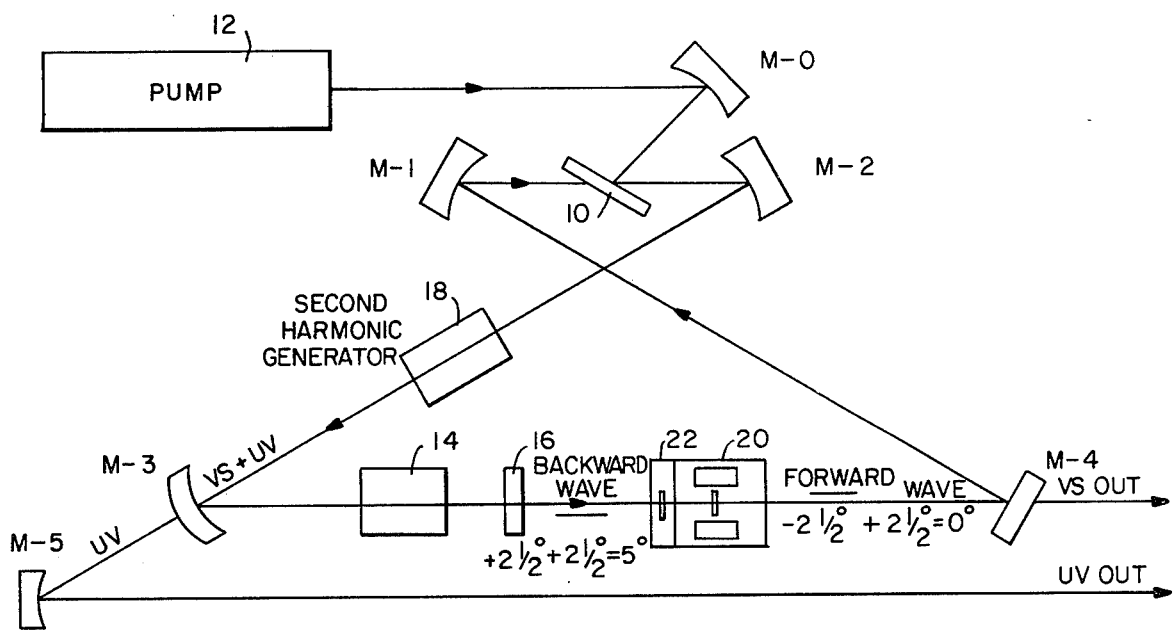
FIG.—1
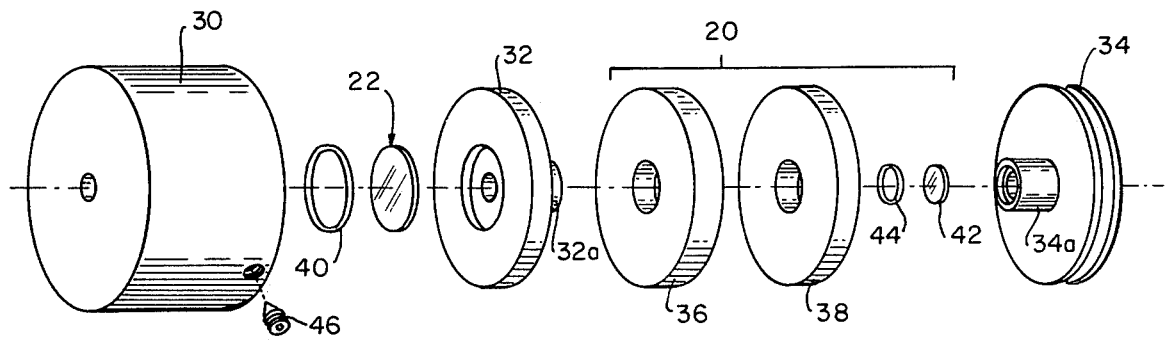
FIG.—2
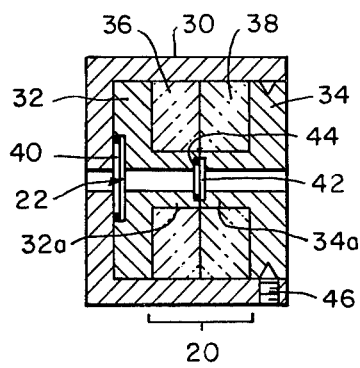
FIG.—3

UNIDIRECTIONAL RING LASER APPARATUS AND METHOD

BACKGROUND OF THE INVENTION

This invention relates to ring lasers capable of supporting running waves in multidirection of operation, and in particular, relates to a method and apparatus for operating ring lasers in single mode, frequency and unidirection of propagation. The present invention finds particular application to dye lasers of the type in which a laser is used to pump a liquid dye contained within a resonator cavity.

In a normal dye laser the amount of single frequency power available is limited by spatial hole burning. Typically, several standing wave modes of resonance of a laser light beam are established and form nodes and anti-nodes within the gain medium and new modes appear at the places where the original mode had a node of the electric field. These detract from the power output capability of the laser in single frequency operation. An improved form of dye laser takes the form of a ring laser which consists of a plurality of laser mirror elements disposed to support laser oscillation in both the forward and backward mode in the form of running waves so that ring lasers are capable of maintaining a greater portion of the gain medium in single frequency oscillation and therefore are capable of higher power outputs by eliminating spatial hole burning. The running waves in ring lasers are counter-rotating and termed herein forward and backward waves, i.e., clockwise and counterclockwise which can be shown to be necessary to obtain single frequency operation. However, in order to obtain maximum, single frequency output of such a device, it is desired that one of the running waves predominate and that the output be taken from the predominant wave.

Attempts to achieve predominance of one wave over the other have not been completely successful and therefore unidirectional stable operation of such ring lasers has not been achieved in a satisfactory manner. In the ring laser a plurality of mirrors are utilized, three being the theoretical minimum but four being typical in order to more conveniently arrange the laser along a linear path. The laser beam passes clockwise (forward) or counterclockwise (backward) between the mirrors. If an extra mirror is placed behind one of the ring cavity mirrors which is allowed to have a transmission characteristic, selective retroreflection of radiation from behind the one mirror may be arranged and this procedure would appear to make the ring laser operate in a single direction. However, it appears that it is very difficult to simultaneously obtain single frequency operation of the ring laser by that procedure. There is, therefore, a need for a new and improved method and apparatus for controlling ring lasers which will provide for single mode, single frequency, and single direction of operation of uniform, high output.

SUMMARY OF THE INVENTION AND OBJECTS

In general it is an object of the present invention to provide a new and improved method and apparatus for controlling operation of ring lasers to overcome the foregoing limitations and disadvantages.

A further object of the invention is to provide a ring laser and operating procedure by which most of the power available within the laser can be channelled into a single direction operating mode and becomes available at a well controlled, single frequency of operation.

Another object of the invention is to provide a ring laser of the dye laser type and which provides an increase in single frequency power and which is capable of operation in a single mode and direction.

Another object of the invention is to provide a ring laser and method and apparatus for its operation of the above character which is sufficiently free of overall frequency sensitivity to be capable of being tuned across a broad range of frequencies while inherently maintaining single frequency, single direction mode of operation despite dispersion effects.

Another object of the invention is to provide a ring laser and method and apparatus for its operation of the above character which achieves the foregoing objects with a device of very small loss.

The foregoing objects are achieved in a ring laser structure having a plurality of mirrors arranged to establish a resonant laser cavity capable of supporting backward and forward laser oscillations, and including a laser active media disposed within the resonator and coupled thereto together with means for pumping the laser active media to develop plane polarized running laser beam waves propagating in both forward and backward directions within the resonator. In accordance with the present invention, means are provided for introducing a substantial shift in the character of one of the laser beam propagating waves, so that, as it passes through the resonator structure, it is sufficiently changed that its loss in multiple passes through the structure is substantially increased. The same means leaves the other of the waves substantially unaffected and therefore capable of reinforcement and development of single direction laser oscillation within the ring structure. In particular, it has been found by the use of a pair of polarization rotator devices that it is possible to achieve selective polarization rotation in one direction only for one of the forward or backward waves while substantially maintaining the polarization in the other direction unaffected. It has been determined that a relatively small degree of rotation is adequate to defeat reinforcement and build-up of laser oscillation for waves propagating in one of the directions while permitting the wave in the opposite direction to build up because its polarization is substantially unaltered. As will be explained herein, the present invention operates even when the unaltered wave is shifted substantially in frequency by a tuning mechanism.

In the specific method and apparatus disclosed and claimed, a Faraday rotator coupled with a natural polarization rotator combine to provide a unidirectional or assymetrical device by which the plane of polarization of a forward wave is rotated by the sum of the rotations while the rotation of the polarization of the opposite wave is the difference. By making each of the rotators approximately equal, the difference becomes approximately nil and therefore such wave is unaffected and reinforced upon successive passes in the cavity.

These and other objects and features of the invention will become apparent from the following description and claims when taken in connection with the accompanying drawings.

BRIEF DESCRIPTION OF THE DRAWINGS

FIG. 1 is a schematic diagram of a ring laser constructed in accordance with the present invention.

FIG. 2 is an exploded view of a unidirectional rotator used in the ring laser of FIG. 1.

FIG. 3 is a cross-sectional view of a unidirectional rotator of FIGS. 1 and 2.

DESCRIPTION OF THE PREFERRED EMBODIMENT

Referring now to FIG. 1, there is shown a schematic diagram of the present invention which includes means of forming a resonator cavity consisting of a plurality of mirror elements disposed to support laser oscillation between them. The arrangement is a typical crossed ring laser arrangement which facilitates separation of the beams while generally arranging the same as a linear form. Thus, mirrors M-1, 2, 3 and 4 are disposed to form the resonator. Mirrors M-1, 2 and 3 are spherical while mirror M-4 is flat. Additional mirrors M-0 and M-5 serve as injection mirror and UV output folding mirror respectively.

Means forming a laser active media 10 is disposed in the beam path within the resonator structure and can consist, for example, of a stream of suitable dye having a high laser gain as, for example, rhodamine 6 G dissolved in ethylene glycol, arranged to form a flowing jet through the resonator beam path.

Means is provided for pumping the dye to develop running laser beam waves propagating within the resonator structure and can consist of, for example, suitable optical pumping arrangement such as provided by an argon laser 12. Suitable argon laser is model 171 as manufactured by Spectra-Physics, Inc. of Mountain View, California.

Means is provided for establishing roughly single frequency of operation and can include gross tuner 14 together with an etalon 16 disposed in series in the beam path within the resonator structure. Typically, a three plate birefringent filter is used as the gross, frequency selective tuner. The etalon is used to provide frequency selection and is typically 25 gigahertz band width. The etalon is generally a coated device having 20–30% reflectivity or uncoated device of low loss, low finesse. Typically, the etalon is formed of fused silica having highly parallel surfaces.

A second harmonic generator 18 is typically employed for generating UV radiation from the visible (VS) of the ring laser itself, the UV output being taken through UV transparent mirror M-3 and focused by folding mirror M-5. Visible output is taken from partially transparent mirror M-4.

Means is disposed in the resonator cavity for introducing a substantial shift in the polarization characteristic of one of the running waves of the laser beam selectively as the same passes through the resonator structure while simultaneously leaving the other of the wave substantially unaffected so that selective constructive reinforcement and development of laser power occurs for the unaffected wave as the same passes around the laser cavity. In the present invention the specific structure for accomplishing the foregoing includes Faraday rotator means 20 for introducing a rotation of the polarization of the forward and backward running laser beams together with normal polarization rotator means 22 for cancelling the rotation for a beam of one direction while adding to the rotation for a beam of another direction. More specifically, the means for introducing a rotation in either direction consists of a magnetically biased Faraday rotator 20 while the means for introducing a rotation which is equal but opposite depending upon the direction of propagation of the running wave consists of a normal polarization rotator 22 which may be constructed of high quality crystalline quartz utlizing optical activity. In operation, the crystalline quartz element introduces a rotation which is dependent upon the direction of propagation of the light through the quartz element.

The following specifications have been found satisfactory for normal polarization rotator of the present invention: material highest quality crystalline quartz shaped in the form of a circular disc approximately 0.125 mm thick and having a diameter of approximately 10 mm crystal orientation C axis (Z axis) perpendicular to side faces within ±1°. The faces are anti-reflection coated to reduce reflection losses in the cavity.

In operation the quartz element exhibits optical activity so that the light beam travelling in one direction along the crystal axis of the crystalline quartz has its plane of polarization rotated in one direction if it enters the rotator from one side and is rotated in the opposite direction if it enters the opposite way. By way of example, a preferred form of the present invention utilized a crystalline quartz rotator of the above specifications, the output of which results in an optical rotation of $-2.5°$ for a forward travelling wave and a $+2.5°$ rotation for a backward travelling wave.

The means for cooperating with the normal rotator for developing a rotation of the waves which is the same in either direction preferably consists of a Faraday rod rotator, magnetically biased. The faces of the Faraday rod are anti-reflection coated to reduce reflection losses in the laser cavity. As is known, particular forms of glass when placed in a strong magnetic field, cause rotation of the plane of polarization of plane polarized light if the same is passed in a direction in which the biasing magnetic field has a component. This effect is known for many solids, liquids and gases and in general, if H is the magnetic intensity parallel to the direction of propagation of the light, the rotation of the plane of polarization for a given wave length is given by $\theta = VHl$ where $l$ is the length of the path in the field and V is Verdet's constant. V is attributed to the substance itself and is different depending upon the material employed. It is important to note that the magnetic rotation with this effect the direction of rotation does not depend upon the direction of propagation. Consequently, the forward laser wave and the backward laser wave both are rotated the same amount in contrast to natural rotation (optical activity) of the crystalline rotator previously described which changes direction with the change in direction of the backward and forward waves. As a practical matter, both of the rotation devices employed preferably in the present invention should be selected from among those providing the least possible loss so that the system as a whole will develop the highest obtainable power. It is an additional requirement of the present invention that the devices have similar dispersion and that the dispersion be maintained within limits such that the possible necessity for adjustment of the strength of magnetic biasing fields and other variables can be avoided. In this way, the method and apparatus of the present invention may be constructed in such a way that once assembled no further adjustment of the parameters are necessary and wavelength tuning through a range of operation of the ring laser device may be accomplished without readjustment or retuning of any other feature of the unidirectional device. In order to accomplish the foregoing, the Faraday rotator and quartz polarization rotator have been especially selected.

In a particular form, a Faraday rod was constructed having approximately the following physical characteristics: material Hoya FR-5 Faraday rotator glass, finished in the form of a cylindrical disc having a thickness of approximately 1.45 mm and approximately 5 mm in diameter. The finish, figure, and wedge characteristics are of high optical quality suitable for laser intracavity use. This rotator is disposed in a magnetic field of approximately 3,500 to 4,000 gauss. The Hoya FR-5 glass is obtainable from Hoya Glass Works, Optical Division, Tokyo, Japan. It is believed that other Faraday rotator glass materials would be operative in the present invention. However, the particular glass selected and given here has a high Verdet constant and appears to have the lowest loss of presently commercially available Faraday rotator glasses. It has also been used as a Faraday rotator in other laser devices of different type with good experience and therefore suggests itself to the present application. Other glasses of similar character are manufactured by Schott Company as SF-6 and Corning, designated 8363. In addition to glasses, other materials are known to possess significant Faraday rotation characteristics but they are also known to exhibit losses which make them less desirable than the FR-5 glass specified above. Generically, the glasses which exhibit the Faraday rotation effect usually have a relatively high lead oxide content and are generally described in the literature.

The Faraday rotator is disposed in a small, compact mounting 30 (FIGS. 2 and 3) which also encloses a pair of magnets which establish a symmetric magnetic field through the Faraday rotator. Such magnets may be selected from a variety of permanent magnet materials, however, one very suitable structure which is relatively inexpensive but provides a high field consists of samarium cobalt disc magnets. A pair of such magnets provides the field strength given above. Such disc magnets are provided with apertures centrally disposed therein and aligned along the beam path of the optical cavity for permitting the same to pass through the rotator device.

The following is a comparison of the properties of the above Faraday rotation glasses:

|  | Hoya FR-5 | | Schott SF-6 | | 8363 (Corning) | |
| --- | --- | --- | --- | --- | --- | --- |
| Verdet Constant (min/ Oe-cm) | 632.8mm | 1.06µ | 632.8mm | 1.06µ | 632.8mm | 1.06µ |
|  | −0.251 | −0.0826 | 0.093 | 0.028 | 0.093 | 0.028 |
| Absorption Coeff. ($cm^{-1}$) | 0.0291 | 0.0086 | 0.0092 | 0.0065 | 0.035 | 0.015 |

By way of example, the following operational specifications were found for one embodiment of the present invention
 laser media—rhodamine 6 G dye,
 laser pump—4 watt argon ion laser,
 dye material, rhodamine 6 G in ethylene glycol,
 gross filter, three plate birefringent,
 etalon 25 gigahertz pass band or free spectral range,
 rotation caused by crystalline quartz normal rotator 2.5° forward direction, −2.5° reverse direction,
 rotation caused by Faraday rotator approximately 2.5° in each direction,
 power output 900 milliwatts, single frequency, one way 1.3 watts, multifrequency, sum of both ways.

The limits of rotation which are recommended in the present invention are related to loss factors. For constant magnetic field, a longer rod gives more rotation but also more optical loss. If larger rotations are utilized one finds by experiment that 5° rotation of each of the rotators will operate satisfactorily and the loss will not be undue. However, with larger rotations the loss becomes significant and should be avoided. In addition, the cost of materials for such rotators is higher than necessary. Therefore, experimentally, it has been found that 2.5° rotation per rotator device also provided entirely satisfactory operation. The physical dimension of the device becomes so small at 2.5° that the further reduction in size does not provide significant advantage when considerations of the ease of handling and fabricating materials is also taken into account. Accordingly, 2.5° rotation represents a reasonably small rotation capable of accomplishing all of the desired features of the present invention but not making the optical components so small that they are difficult to manufacture and handle. In addition, for the device described the implementation of the biasing magnetic field perpendicular to the polished faces of the Faraday rotator disc is straightforward.

The normal rotator and the Faraday rotator of the present invention may conveniently be incorporated in a unitary structure as exemplified in FIGS. 2 and 3. Thus, as shown, there is provided an outer housing 30 containing a pair of fixture clamps in the form of circular discs having inwardly extending projections 32a, 34a therefrom which supports the samarium cobalt magnets 36, 38. The crystal quartz rotator 22 rests in a recess provided in the end of one of the discs and is held therein by an O-ring seal 40. The Faraday rotator glass element 42 is held between the projections 34a, 36a of the fixtures in a recess together with an O-ring seal 44 for taking up compression. The entire device is easily assembled by sliding the parts together in the relative position shown in FIG. 2 and fixing the same with a suitable set screw 46 passing through the side of the housing and locking the outer fixture and clamp 34 in place. FIG. 3 shows this unidirectional device assembled with all parts in final operating position and also illustrates the aligned aperture through the device through which the beam passes in traversing the rotators.

Thus, there has been provided an improved ring laser structure incorporating unidirectional device for establishing single frequency, single direction oscillation within the cavity. The device has an acceptably low insertion loss and nearly, of itself, provides nearly single frequency operation without the use of an etalon (although an etalon has been shown in the preferred form of the invention to provide assurance of single frequency operation). The device employs normal optical activity and the Faraday effect to achieve selective rotation of the plane of polarization of the backward running wave within the ring structure to thereby cause that running wave to fail to be amplified in successive passes and therefore to die out relative to the unaffected forward wave. It is to be understood that both in normal optical activity and in the Faraday effect, there is significant dispersion, that is to say, the degree of rotation of the normal materials depend upon the wave length as does the Verdet constant of a Faraday rod. In accordance with this invention, these are matched over a wide range of frequencies in such a way that the device works without adjustment of the biasing magnetic field or any other element over the complete tuning range of, for example, rhodamine 6 G dye and is expected also to work in the same way for other frequency ranges of operation with other dyes. Thus, there has been provided a single non-adjustable device incorporated within the ring laser structure free of adjustments to magnetic fields or thicknesses of the components, which device works to render the ring laser unidirectional in operation over the complete tuning range of the dye used. It should also be understood that the degree of match of the dispersion is not highly critical, that is to say, a dispersion range from 2° rotation at 6,000 angstroms might develop to 4° at 5,000 angstroms and the tracking of the dispersion will still be within 0.5°, for example. While this is not theoretically desired, it is still found to be an acceptable level of rotation and is within a normal operating range of the device for maintenance of oscillation of the forward wave. Thus, it is found that dispersions, while not exact, nevertheless track sufficiently well to permit operation over the entire range without adjustment.

What is claimed is:

1. A ring laser comprising a laser resonator capable of supporting running waves in both forward and backward directions within said resonator, an ion laser pumped liquid dye capable of lasing over a wide wave length range disposed within the path of radiation within said resonator structure and coupled thereto, tuning means for continuously tuning the ring laser over a tuning range of lasing to produce any single selected frequency or wave length within said range, ion laser pumping means for pumping said dye to develop running first and second laser beam waves propagating both in the forward and backward direction respectively within said resonator, polarization shifter means for causing preferential oscillation of one of said waves in unidirectional single frequency operation and effective to produce high single frequency power over the tuning range, said shifter means comprising a combination of a Faraday rotator in series with a polarization rotator and in which combination each rotator is rotated through only a small angle to shift the plane of polarization of a propagating wave traveling in one direction in an amount which is sufficient to impair amplification and to defeat reinforcement and build-up of laser oscillation of the wave traveling in said one direction while leaving the plane of polarization of the propagating wave traveling in the other direction substantially unaffected so that the unaffected wave is constructively reinforced in gain by said resonator and dye to thereby develop said unidirectional single frequency operation.

2. A ring laser as defined in claim 1 wherein each of said rotators is of the proper dimension to effect approximately the same degree of rotation of said beam and said rotators form a rotator couple in which their effects add for one direction of propagation therethrough and cancel for the other direction of propagation therethrough.

3. A ring laser as defined in claim 2 in which said Faraday rotator and said polarization rotator have similar dispersion characteristics and wherein the rotators do not have to produce exact cancellation in one direction and said ring laser operates over a wide range of frequencies without readjustment of the polarization shifter means.

4. A ring laser as defined in claim 2 wherein the rotator couple comprises a polarization rotator constructed of crystalline material and having a rotation therethrough of approximately a range from about 1°–5° together with a Faraday rotator also having a rotation therethrough of approximately 1°–5° and approximately equal to that of said polarization rotator and wherein the dispersion characteristics of the two rotators are sufficiently similar to render the rotator couple effective to produce the unidirectional single frequency operation of the ring laser even when the two rotators have a difference in the amount of relative rotation in the range of 2°–3°.

5. A ring laser as defined in claim 4 in which said polarization rotator is crystalline quartz and said Faraday rotator is Hoya FR-5 glass having low optical loss and high Verdet constant and easily fabricated into optical components together with means forming a magnetic field axially aligned with the direction of propagation of the laser beam wave therethrough and having a field strength of approximately 3,500 to 4,000 gauss disposed to magnetically bias said Faraday rotator glass.

6. A ring laser as defined in claim 5 in which said polarization rotator is approximately 0.125 mm thick and possesses a polarization rotation effect of about 2.5° and further in which said Faraday rotator Hoya FR-5 is approximately 1.45 mm thick and possesses a rotation effect of about 2.5°.

7. Apparatus as in claim 6 in which said laser active media is rhodamine 6 G and in which said ring laser further is provided with means for tuning the same through a range of 5600 to 6400 angstroms.

8. A method of operating a ring laser of the kind having a laser resonator capable of supporting ring oscillation in both forward and backward modes within said resonator, an ion laser pumped liquid dye capable of lasing over a wide wave length range disposed within the path of radiation within said resonator structure and coupled thereto, tuning means for continuously tuning the ring laser over a tuning range of lasing to produce any single selected frequency or wave length within said range, ion laser pumping means for pumping said dye to develop running first and second laser beam waves propagating both in the forward and backward direction respectively within said resonator, said method comprising shifting the plane of polarization of a propagating wave traveling in one direction in an amount sufficient to impair amplification and to defeat reinforcement and build-up of laser oscillation of the wave traveling in said one direction while leaving the plane of polarization of the propagating wave traveling in the other direction substantially unaffected so that the unaffected wave is constructively reinforced in gain by said resonator and dye to thereby develop the unidirectional single frequency operation, said step of shifting including placing within the beam path a combination of a Faraday rotator in series with a polarization rotator with each rotator cut to the proper dimension to effect approximately the same degree of rotation of the beam in the range of 1°–5°, said rotators forming a rotator couple in which their effects add for one direction of propagation therethrough and cancel for the other direction of propagation therethrough, and wherein said rotators have similar dispersion characteristics and the rotators do not have to produce exact cancelation in said one direction and operate to produce high single frequency power over a broad tuning range of the ring laser without re-adjustment of the rotators.

* * * * *